(12) United States Patent
Chen

(10) Patent No.: US 7,949,369 B2
(45) Date of Patent: May 24, 2011

(54) COMPUTER APPARATUS, WIRELESS NETWORK TRANSMISSION SYSTEM AND TRANSMISSION METHOD THEREOF

(75) Inventor: Yu Chen, Chung Li (TW)

(73) Assignee: Elitegroup Computer Systems Co., Ltd., Taipei (TW)

( * ) Notice: Subject to any disclaimer, the term of this patent is extended or adjusted under 35 U.S.C. 154(b) by 780 days.

(21) Appl. No.: 11/415,212

(22) Filed: May 2, 2006

(65) Prior Publication Data

US 2007/0129107 A1 Jun. 7, 2007

(30) Foreign Application Priority Data

Dec. 2, 2005 (TW) .............................. 94142570 A

(51) Int. Cl.
*H04M 1/00* (2006.01)
(52) U.S. Cl. ..................... 455/556.1; 455/572; 455/573; 455/574; 713/300; 713/340
(58) Field of Classification Search .......... 455/572–574, 455/556.1, 343.5, 343.6; 713/300–340
See application file for complete search history.

(56) References Cited

U.S. PATENT DOCUMENTS

| | | | | |
|---|---|---|---|---|
| 2003/0023761 A1* | 1/2003 | Jeansonne et al. | ............ | 709/250 |
| 2003/0139207 A1* | 7/2003 | Yamazaki | .................... | 455/573 |
| 2004/0097257 A1* | 5/2004 | Lee | ............................. | 455/550.1 |
| 2006/0056336 A1* | 3/2006 | Dacosta | ........................ | 370/328 |

FOREIGN PATENT DOCUMENTS

EP 0875977 A2 * 11/1998

* cited by examiner

*Primary Examiner* — Edward Urban
*Assistant Examiner* — Fayyaz Alam
(74) *Attorney, Agent, or Firm* — WPAT, P.C.; Anthony King

(57) ABSTRACT

A computer apparatus, a wireless network transmission system and its transmission method are disclosed. The computer apparatus comprises a power supplier, a first circuit architecture, a second circuit architecture and a power controller. A power is provided by the power supplier. The main functionality of the computer apparatus is provided by the first circuit architecture. The second circuit architecture includes a controller, a storage unit and a communication unit. The power controller is electrically connected to the power supplier to provide the power to the first circuit architecture or the second circuit architecture. The first circuit architecture includes the second circuit architecture. The power provided by the power controller is supplied to the first circuit architecture while the computer apparatus is in operating state. The power provided by the power controller is supplied to the second circuit architecture while the computer apparatus is in power-off state. The communication unit is then utilized for wireless transmission.

20 Claims, 9 Drawing Sheets

COMPUTER APPARATUS, WIRELESS NETWORK TRANSMISSION SYSTEM AND TRANSMISSION METHOD THEREOF

FIELD OF THE INVENTION

The present invention relates to a computer apparatus, a wireless network transmission system and a transmission method and, more particularly, to the computer apparatus, the wireless network transmission system and the transmission method performing a wireless transmission while in power-off state.

BACKGROUND OF THE INVENTION

A notebook computer is in widespread use and replaces desktops in some respects. The notebook computer is easy to carry. A wireless communication apparatus in the notebook computer must be activated by a microprocessor and an operation of related circuits when a main system of the notebook computer is in operating state, such as a global system for mobile communication (GSM) data modem, a wireless local area network (WiLan), a wireless fidelity (WiFi) or a Worldwide Interoperability for Microwave Access (WiMAX). In other words, a wireless communication apparatus performs a wireless transmission when the notebook computer is in operating state. For instance, a user would like to download an electronic mail via the notebook computer while moving; the electronic mail must be downloaded and stored when the notebook computer is in operating state. The consequence may cause power waste. Another situation is that the notebook computer needs to be taken out and a downloading must be discounted so as to shutdown immediately. The downloading for electronic mails may not be completed that also causes inconveniences.

In a conventional electronic mail receiving, the notebook computer needs to be turned on first. Electronic mail administration program is then executed. Electronic mails are then downloaded by the wireless communication apparatus. When the notebook computer is in power-off state, the user is unable to download electronic mails. If the user needs to download electronic mails, the notebook computer must be turned on and related programs are then activated to download electronic mails, thereby causing many inconveniences for the user and consuming unnecessary power.

The inventor of the present invention based on years of experience on related research and development of the computer apparatus invents a computer apparatus, a wireless network transmission system and a transmission method to overcome the foregoing shortcomings.

SUMMARY OF THE INVENTION

Accordingly, the object of the present invention provides a computer apparatus which includes a first power supplier, a first circuit architecture, a second circuit architecture and a power controller. The first power supplier is for supplying a power. The first circuit architecture provides a main function for the computer apparatus. The second circuit architecture includes a first storage unit, a communication unit and a controller. The power controller is electrically connected to the power supplier so as to provide a power for the first circuit architecture or the second circuit architecture. The first circuit architecture includes the second circuit architecture. A power is supplied to the first circuit architecture, thereby performing a wireless transmission through the communication unit while in operating state. A power is supplied to the second circuit architecture, thereby performing the wireless transmission through the communication unit while in power-off state.

In addition, the present invention further provides a wireless network transmission system which has a remote server and a computer apparatus. The computer apparatus has a first power supplier, a power controller and a communication unit. The power controller controls the power supplier. When the computer apparatus is in operating state or power-off state, the wireless transmission is performed between the communication unit and the remote server.

The present invention further provides a method for wireless network transmission which is applied for a computer apparatus and a remote server to perform a wireless transmission. The computer apparatus includes a first power supplier, a first circuit architecture, a second circuit architecture and a power controller. The first power supplier is for providing a power. The first circuit architecture includes the second circuit architecture. The second circuit architecture includes a controller, a first storage unit and a communication unit. In the method, the computer apparatus is determined whether it is in operating state or power-off state. If the computer apparatus is in operating state, the power controller supplies a power to the first circuit architecture so as to perform a wireless transmission between the communication unit and the remote server. If the computer apparatus is in power-off state, the power controller supplies a power to the second circuit architecture so as to perform a wireless transmission between the communication unit and the remote server.

Therefore, the power controller is electrically connected to the power supplier in order to provide a power for the first circuit architecture or the second circuit architecture. When the computer apparatus is in operating state, a power is supplied to the first circuit architecture so as to perform a wireless transmission between the communication unit and the remote server. When the computer apparatus is in power-off state, a power is supplied to the second circuit architecture so as to perform a wireless transmission between the communication unit and the remote server. The computer apparatus could perform a wireless transmission continuously without disconnection. A user may connect while in power-off state. The convenience could be increased. The power consumption of the computer apparatus is then saved.

Other features and advantages of the present invention and variations thereof will become apparent from the following description, drawings, and claims.

DETAILED DESCRIPTION OF THE PREFERRED EMBODIMENTS

To make the description easier for understanding the objective of the invention, its innovative features and performance, a detailed description and technical characteristics of the computer apparatus, the wireless network transmission system and the transmission method are described together with the drawings as follows.

Figure 1:
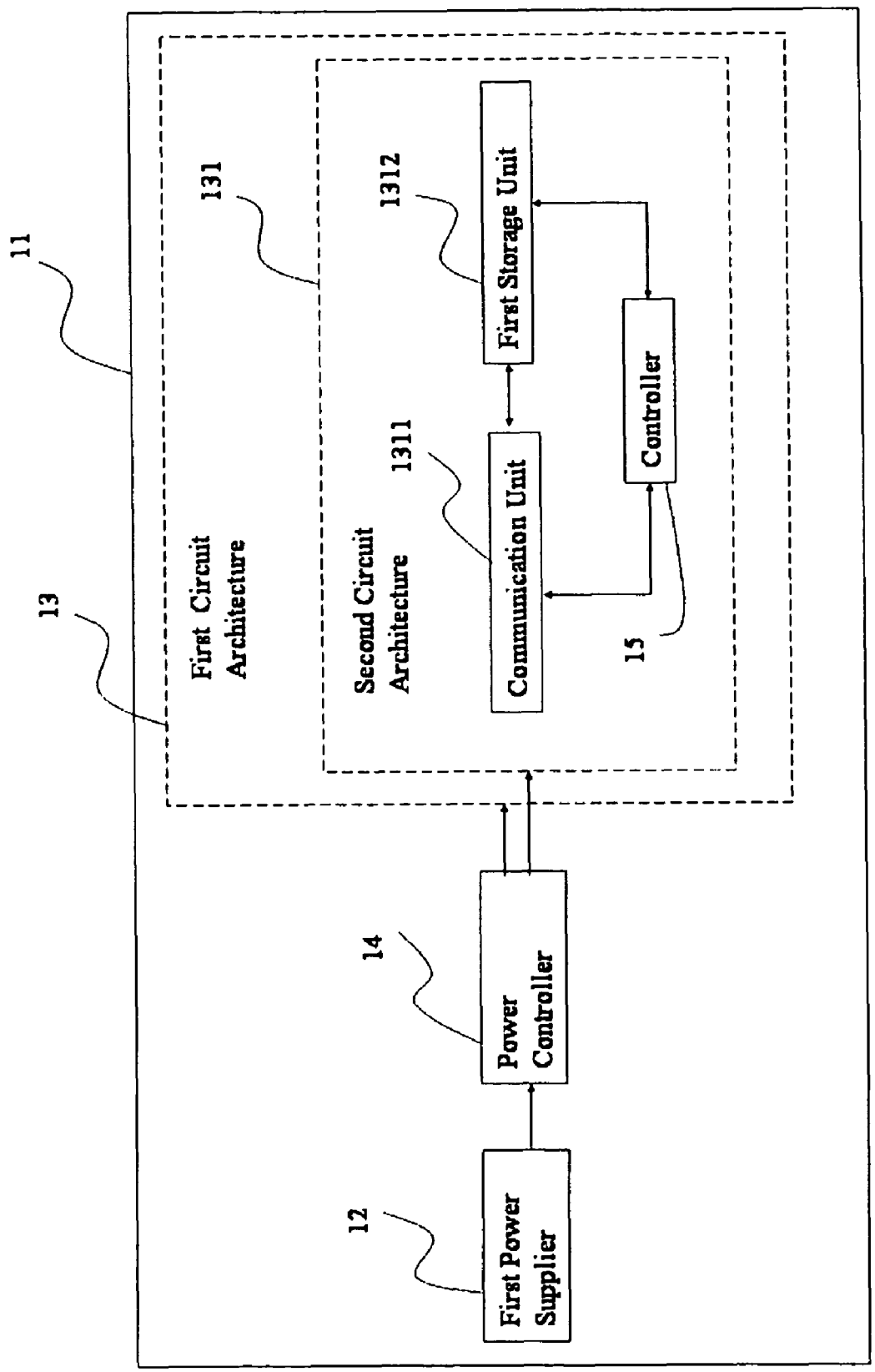
FIG. 1 is a block diagram illustrating a computer apparatus according to an embodiment of the present invention.

Referring to FIG. 1, a block diagram illustrates a computer apparatus according to an embodiment of the present invention. The computer apparatus 11 comprises a first power supplier 12, a first circuit architecture 13, a second circuit architecture 131 and a power controller 14. The first power supplier 12 is for supplying a power. The first circuit architecture 13 provides a main function of the computer apparatus 11. The second circuit architecture 131 includes at least a controller 15, a first storage unit 1312 and a communication unit 1311. The first storage unit 1312 is for storing data. The communication unit 1311 is for providing a wireless transmission. The controller 15 performs a transmission sequence like file transfer protocol (FTP), so as to perform the wireless transmission through the communication unit 1311. The power controller 14 is electrically connected to the first power supplier 12 to supply a power for the first circuit architecture 13 or the second circuit architecture 131. The first circuit architecture 13 has the second circuit architecture 131. When the computer apparatus 11 is in operating state, a power supplied by the first power supplier 12 is supplied to the first circuit architecture 13 so as to perform a wireless transmission through the communication unit 1311. When the computer apparatus 11 is in power-off state, a power supplied by the first power supplier 12 is supplied to the second circuit architecture 131 so as to perform a wireless transmission through the communication unit 1311. The wireless transmission includes downloading data. Downloaded data is stored in the first storage unit 1312. The controller 15 is a microcontroller. The first power supplier 12 is a battery or a socket power. The communication unit 1311 is a wireless communication apparatus such as a global system for mobile communication (GSM) data modem, a wireless local area network (WiLan), a wireless fidelity (WiFi) or a Worldwide Interoperability for Microwave Access (WiMAX). The first storage unit 1312 is a hard drive or an optical disk drive. The power controller 14 is at least an electronic switch.

Figure 2:
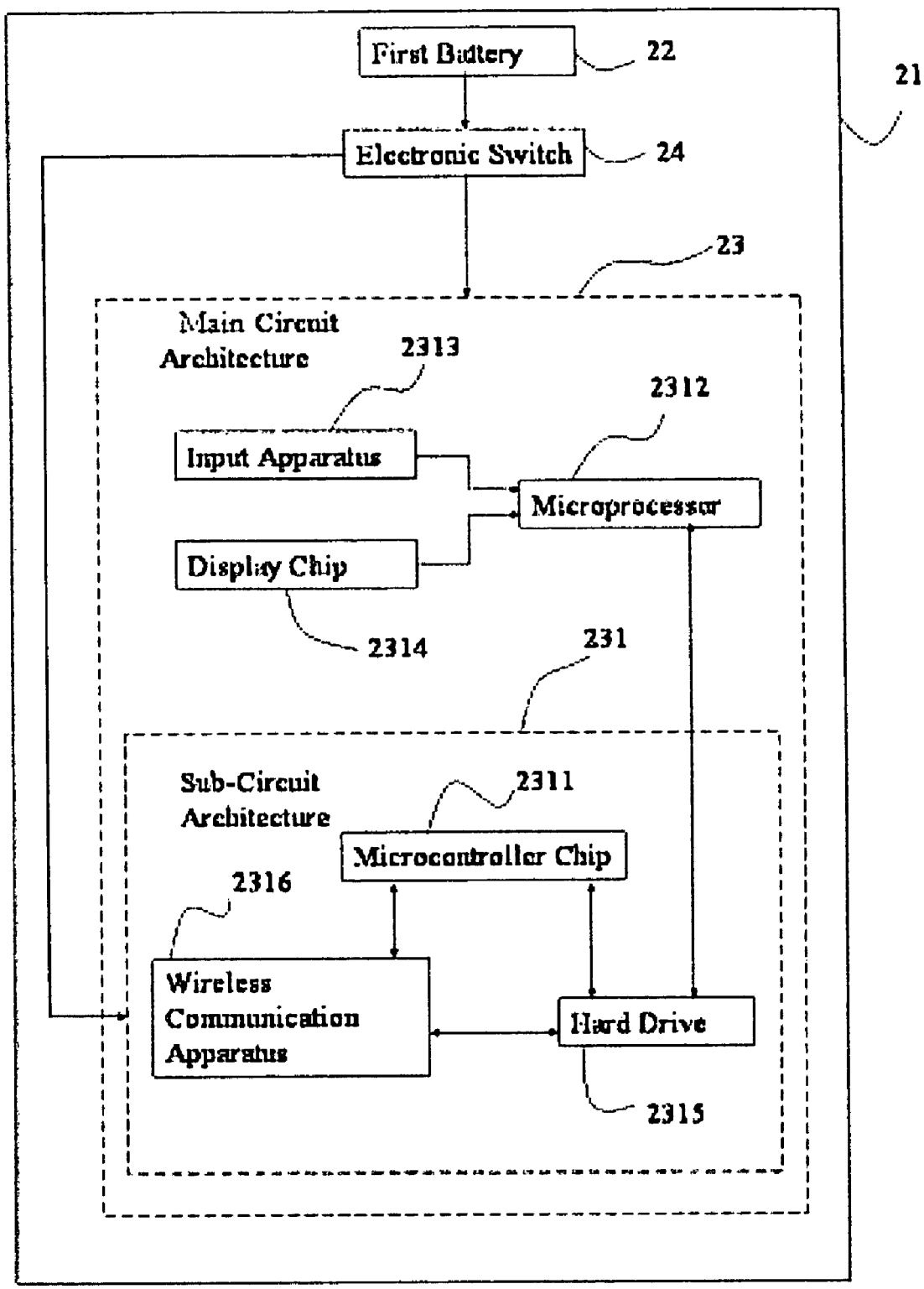
FIG. 2 is a block diagram illustrating a computer apparatus according to a preferred embodiment of the present invention.
Figure 3:
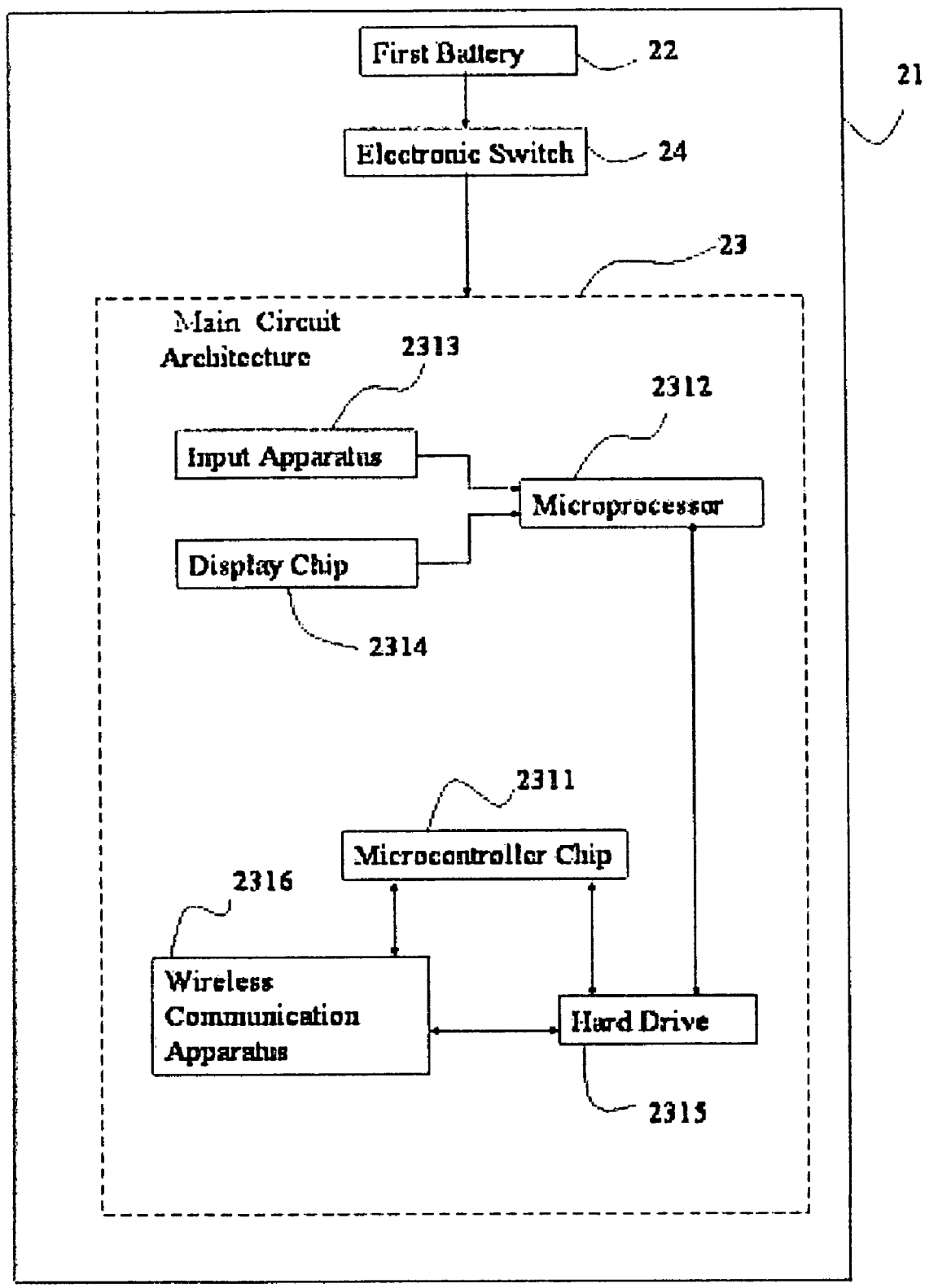
FIG. 3 is a block diagram illustrating a computer apparatus according to a preferred embodiment of the present invention.
Figure 4:
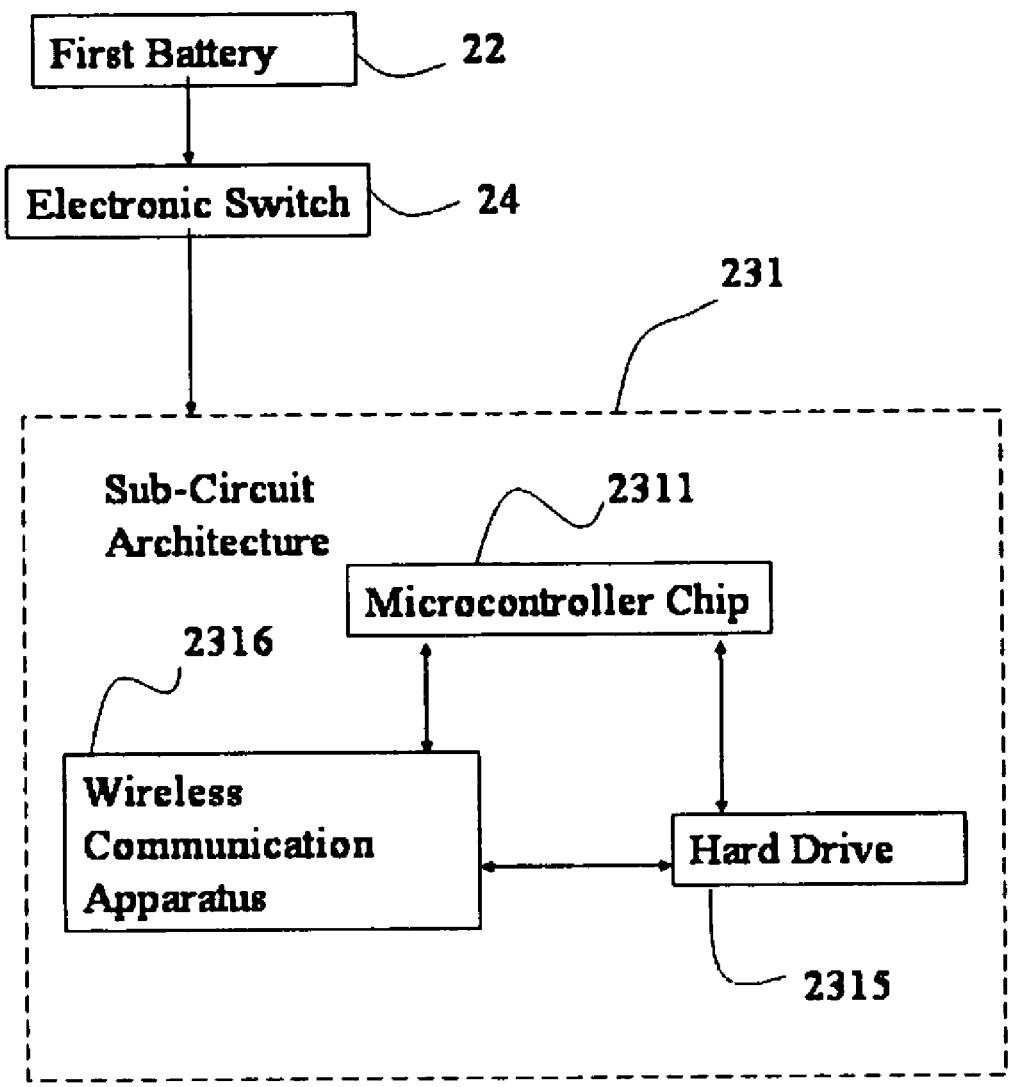
FIG. 4 is a block diagram illustrating a computer apparatus according to a preferred embodiment of the present invention.

Referring to FIG. 2 to FIG. 4, block diagrams illustrate a computer apparatus according to preferred embodiments of the present invention. A notebook computer 21 is an example. The notebook computer 21 comprises a first battery 22, a main circuit architecture 23, a sub-circuit architecture 231 and an electronic switch 24. The first battery 22 is for providing a power. The main circuit architecture 23 provides a main function for the notebook computer 21 and has a microprocessor 2312, an input apparatus 2313 and a display chip 2314. The microprocessor 2312 is for performing calculations. The input apparatus 2313 is for inputting data. The display chip 2314 is for displaying. The sub-circuit architecture 231 includes a microcontroller chip 2311, a hard drive 2315 and a wireless communication apparatus 2316 such as GSM data modem, WiLan, WiFi or WiMAX. The main circuit architecture 23 includes the circuit architecture 231. The electronic switch 24 is for switching the first battery 22 to the power supply circuit of the main circuit architecture 23 or the power supply circuit of the sub-circuit architecture 231. When the notebook computer 21 is in operating state as shown in FIG. 3, the electronic switch 24 switches the first battery 22 to the power supply circuit of the main circuit architecture 23 so as to provide the wireless communication apparatus 2316 to perform a wireless transmission. When the notebook computer 21 is in power-off state as shown in FIG. 4, the electronic switch 24 switches the first battery 22 to the power supply circuit of the sub-circuit architecture 231 so as to provide the wireless communication apparatus 2316 to perform a wireless transmission. The wireless transmissions include downloading or uploading data. Downloaded or uploaded data is then stored in the hard drive 2315.

In addition, when the notebook computer 21 is in operating state, the microcontroller chip 2311 could control the wireless communication apparatus 2316 to perform the wireless transmission based on demands. The loading of the microprocessor 2312 can be decreased, thereby improving the efficiency of the notebook computer 21.

Figure 5:
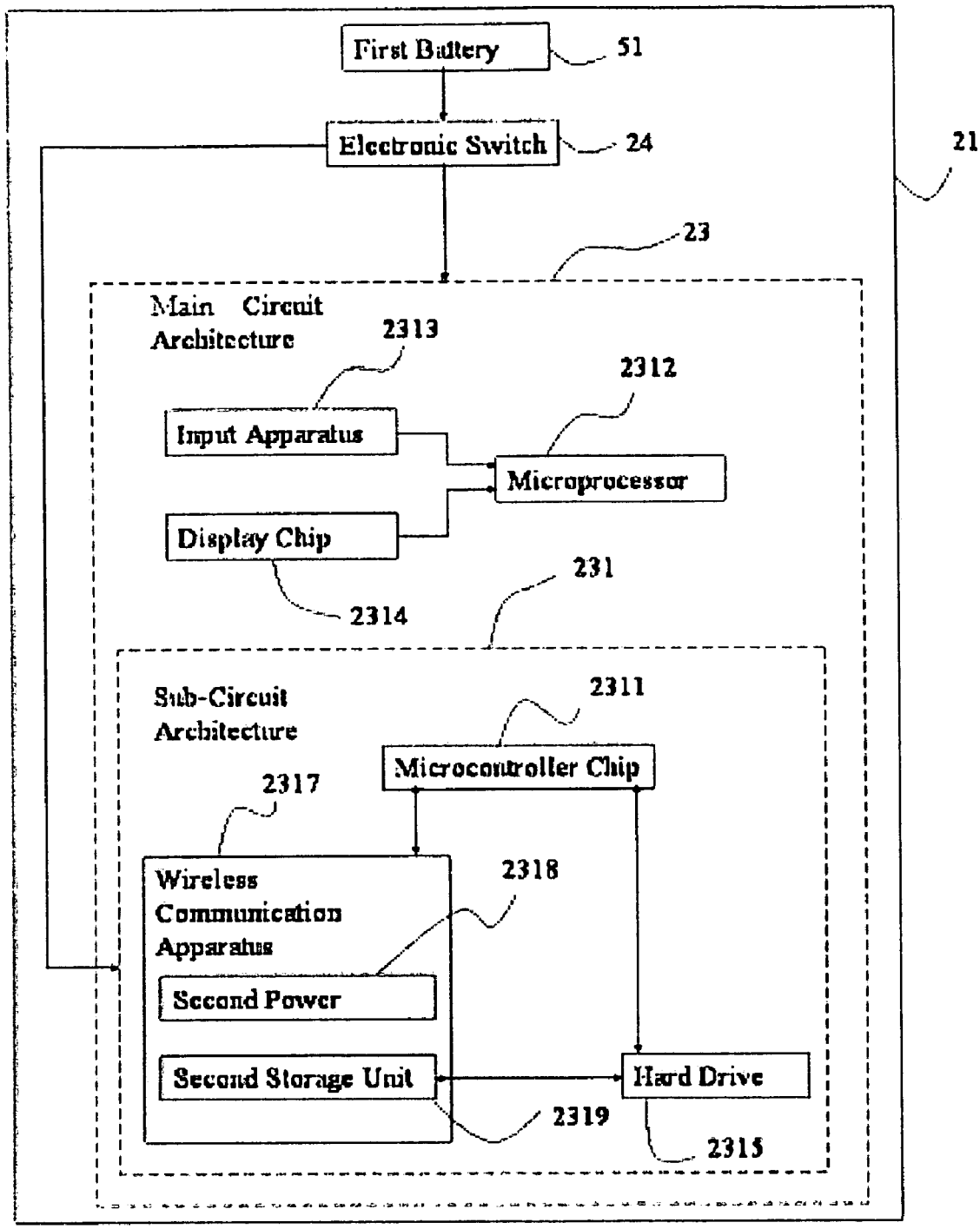
FIG. 5 is a block diagram illustrating a computer apparatus according to another embodiment of the present invention.

Referring to FIG. 5, a block diagram illustrates a computer apparatus according to another embodiment of the present invention. The notebook computer 21 includes a first power 51, a main circuit architecture 23, a sub-circuit architecture 231 and an electronic switch 24. The first power 51 is for providing a power. The main circuit architecture 23 provides a main function of the notebook computer 21 and has a microprocessor 2312, an input apparatus 2313 and a display chip 2314. The sub-circuit architecture 231 has a microcontroller chip 2311, a hard drive 2315 and a wireless communication apparatus 2317. The wireless communication apparatus 2317 has a second power 2318 and a second storage unit 2319. The main circuit architecture 23 includes the sub-circuit architecture 231. The second storage unit 2319 is a memory card or a flash memory. When the notebook computer 21 is in power-off state, if a capacity provided by the second power 2318 is higher than a predetermined capacity, a power supplied by the second power 2318 is supplied to the wireless communication apparatus for performing a wireless transmission; if a capacity provided by the second power 2318 is lower than the predetermined capacity, a power supplied by the first power 51 is supplied to the wireless communication apparatus 2317 for performing a wireless transmission. Furthermore, when capacity provided by the second power 2318 is lower than a predetermined capacity and the first power 51 is a socket power, the second battery 2318 is charged by the first power 51 in order to obtain a required power for the notebook computer while downloading and moving. The wireless transmission includes downloading or uploading data. When the notebook computer 21 is in power-off state, downloaded data or uploaded data is selected by the microcontroller chip 2311 to store in the hard drive 2315 or the second storage unit 2319. When the notebook computer 21 is in operating state, downloaded data or uploaded data is selected by the microprocessor 2312 or the microcontroller chip 2311 to store in the hard drive 2315. While in power-off state, downloaded data stored in the second storage unit 2319 is transferred by manual way or automatic way to the hard drive 2315 based on demands.

In addition, when a user downloads data via the wireless communication unit 2317 while in power-off state, a liquid crystal module (LCM) is placed in an appropriate position of the notebook computer 21 for displaying a message of the wireless transmission. The message is a download state such as "download state" or "download percentage". When the user downloads data via the wireless communication unit 2317 in operating state, the message is displayed by a screen of the notebook computer 21 to remind the user.

Figure 6:
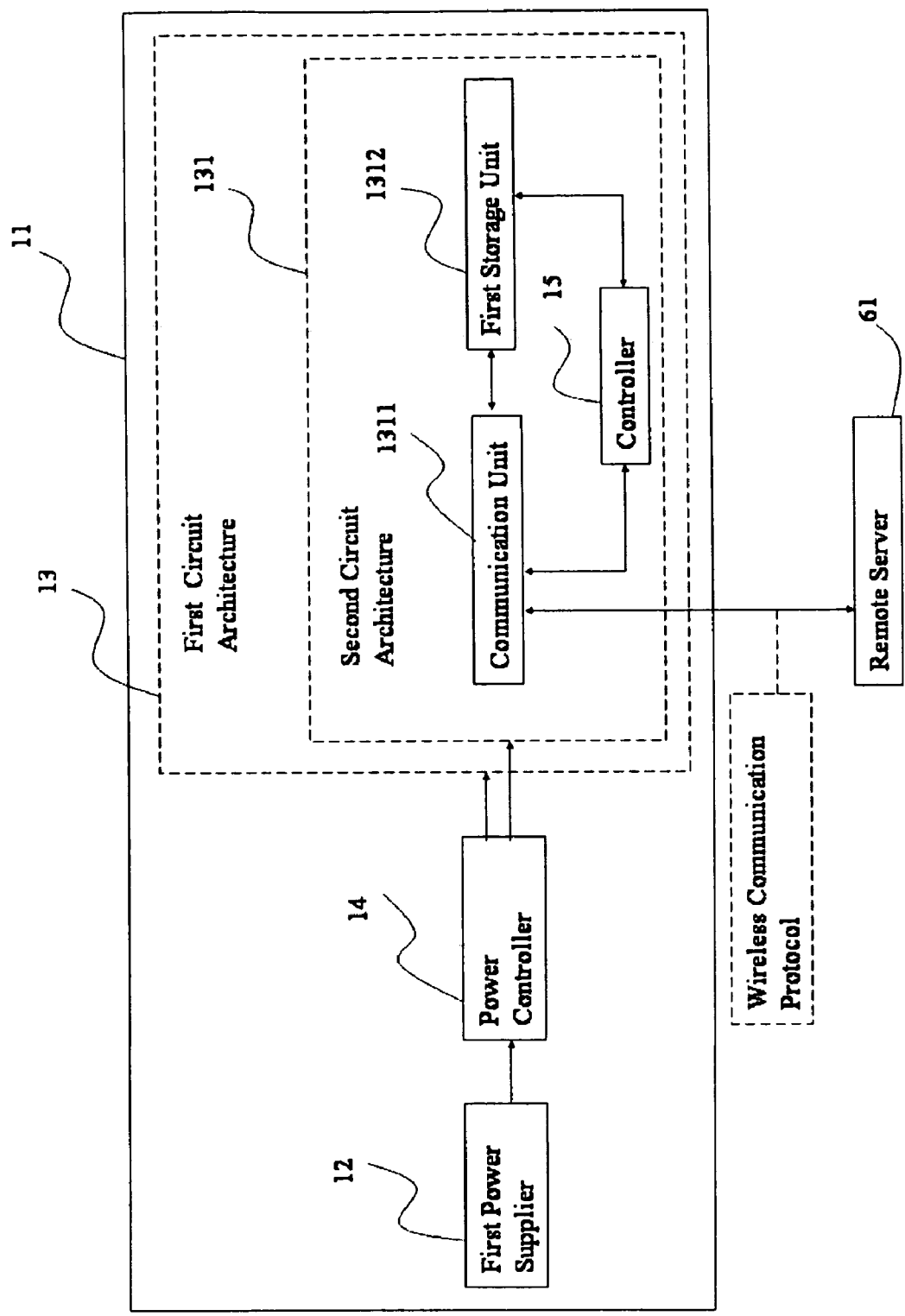
FIG. 6 is a block diagram illustrating a wireless network transmission system according to an embodiment of the present invention

Referring to FIG. 6, a block diagram illustrates a wireless network transmission system according to an embodiment of the present invention. The wireless network transmission system includes a remote server 61 and a computer apparatus 11 (as shown in FIG. 1) The computer apparatus 11 has at least a first power supplier 12, a first circuit architecture 13, a second circuit architecture 131 and a power controller 14. The first circuit architecture 13 provides a main function of the computer apparatus 11. The second circuit architecture 131 includes at least a controller 15, a first storage unit 1312 and a communication unit 1311. The first storage unit 1312 is for storing data. The communication unit 1311 is for providing a wireless transmission. The controller 15 is for performing a transmission sequence like file transfer protocol (FTP), so as to implement a wireless transmission via the communication unit 1311. The power controller 14 is electrically connected to the first power supplier 12 for supplying a power to the first circuit architecture 13 or the second circuit architecture 131. The first circuit architecture 13 includes the second circuit architecture 131. When the computer apparatus 11 is in operating state, a power supplied by the first power supplier 12 is supplied to the first circuit architecture 13 so as to perform a wireless transmission between the communication unit 1311 and the remote server 61. When the computer apparatus 11 is in power-off state, a power supplied by the first power supplier 12 is supplied to the second circuit architecture 131 so as to perform a wireless transmission between the communication unit 1311 and the remote server 61. A wireless communication protocol is employed to transmit packet data between the communication unit 1311 and the remote server 61. The wireless transmission includes downloading data or uploading data. Downloaded or uploaded data is stored in the first storage unit 1312. The first power supplier 12 is a battery or a socket power. The controller 15 is a microcontroller chip. The communication unit 1311 is a wireless communication apparatus such as GSM data modem, WiLan, WiFi or WiMAX. The first storage unit 1312 is a hard drive or an optical disk drive. The power controller 14 is at least an electronic switch.

Figure 7:
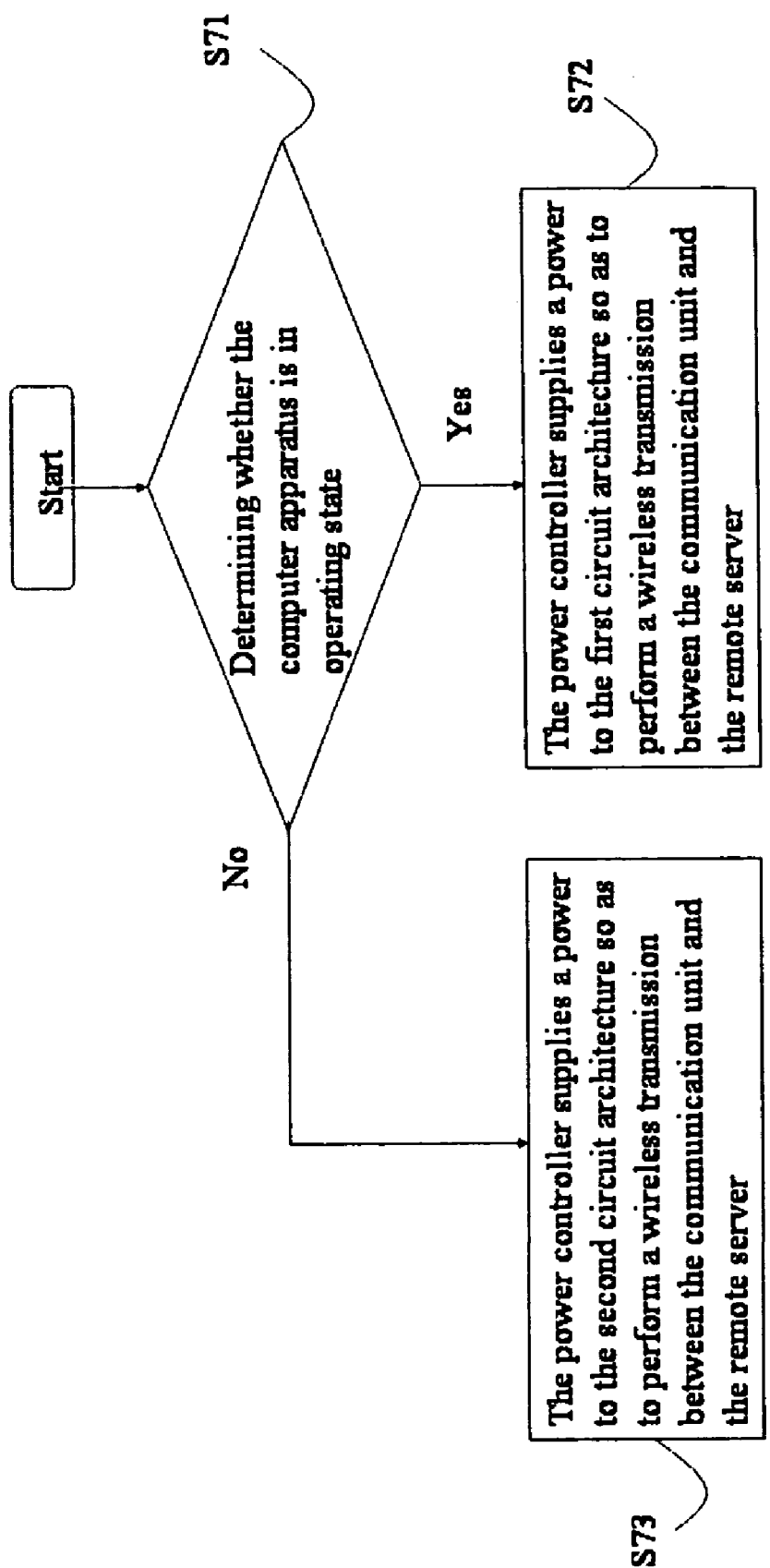
FIG. 7 is a flowchart illustrating a method for wireless network transmission according to an embodiment of the present invention.

Referring to FIG. 7, a flowchart illustrates a method for wireless network transmission according to an embodiment of the present invention. The method is applied in a computer apparatus (as shown in FIG. 1) and a remote server for performing a wireless transmission. Step S71, the computer apparatus is determined whether it is in operating state. Step S72, if the computer apparatus is in operating state, the power controller supplies a power to the first circuit architecture so as to perform a wireless transmission between the communication unit and the remote server. Step S73, if the computer apparatus is in power-off state, the power controller supplies a power to the second circuit architecture so as to perform a wireless transmission between the communication unit and the remote server.

Figure 8:
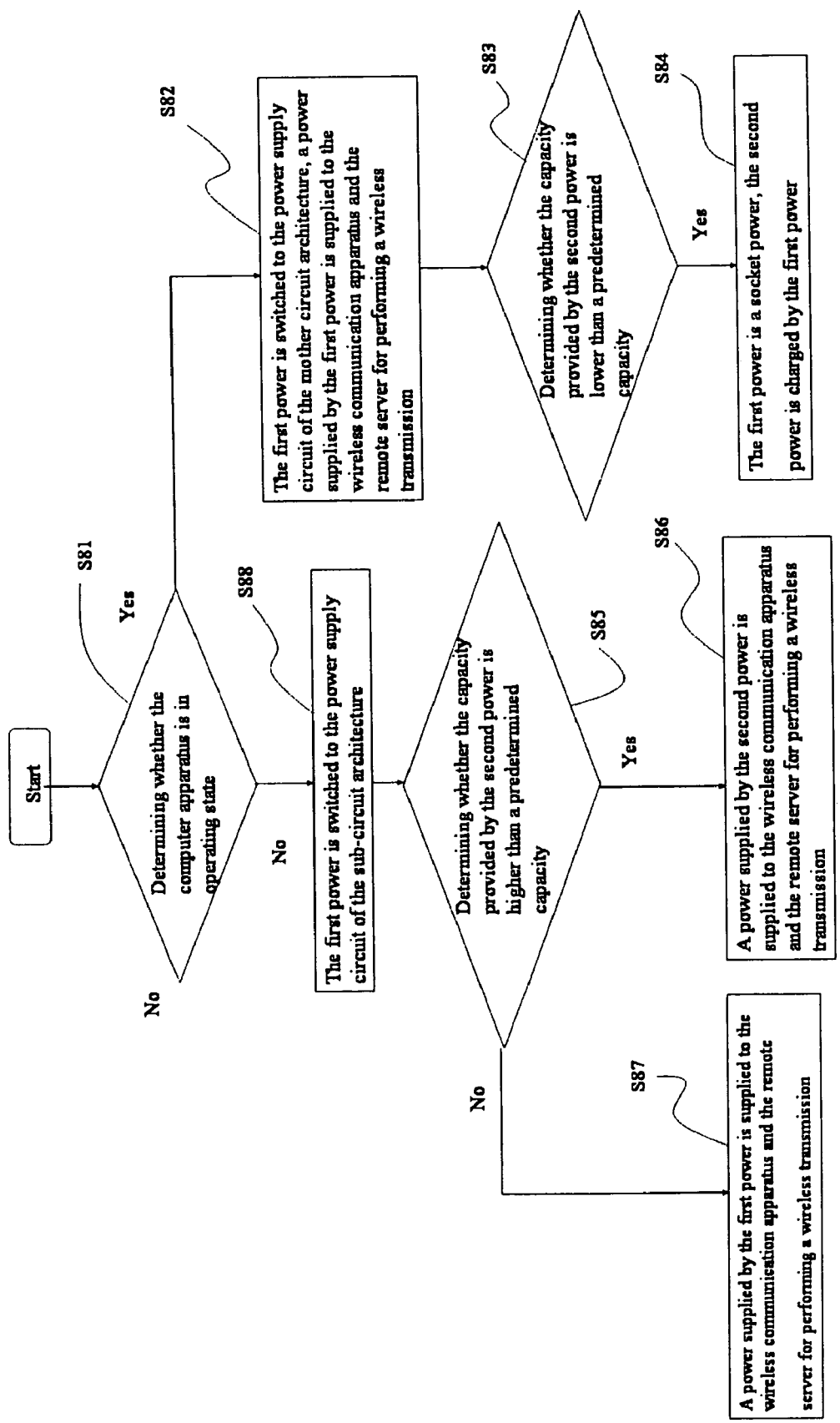
FIG. 8 is flowchart illustrating a method for wireless network transmission according to a preferred embodiment of the present invention.

Referring to FIG. 8, a flowchart illustrates a method for wireless network transmission according to a preferred embodiment of the present invention. The method is applied in a notebook computer (as shown in FIG. 5) and a remote server for performing a wireless transmission. Step S81, the notebook computer is determined whether it is in operating state. Step S82, if the notebook computer is in operating state, the first power is switched to the power supply circuit of the main circuit architecture, a power supplied by the first power is supplied to the wireless communication apparatus and the remote server for performing a wireless transmission. Step S83, a capacity provided by the second power is determined whether the capacity is lower than a predetermined capacity. Step S84, if the capacity provided by the second power is lower than a predetermined capacity and the first power is a socket power, the second power is charged by the first power. Step S88, if the notebook computer is in power-off state, the first power is switched to the power supply circuit of the sub-circuit architecture. Step S85, a capacity provided by the second power is determined whether the capacity is higher than a predetermined capacity. Step S86, if the capacity provided by the second power is higher than a predetermined capacity, a power supplied by the second power is supplied to the wireless communication apparatus and the remote server for performing a wireless transmission. Step S87, if the capacity provided by the second power is lower than a predetermined capacity, a power supplied by the first power is supplied to the wireless communication apparatus and the remote server for performing a wireless transmission.

Figure 9:
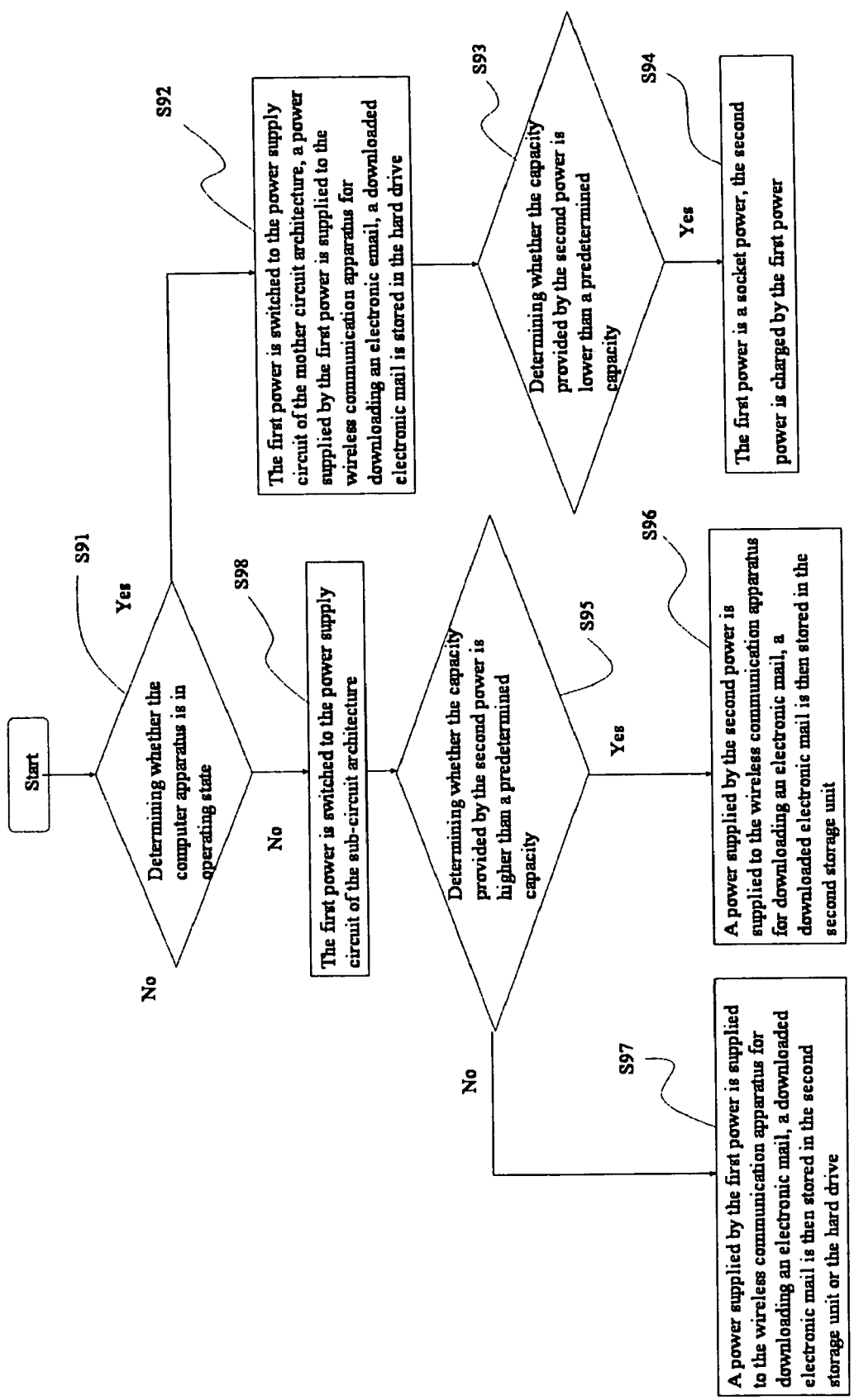
FIG. 9 is a flowchart illustrating a method for wireless network transmission according to another preferred embodiment of the present invention.

Referring to FIG. 9, a flowchart illustrates a method for wireless network transmission according to another preferred embodiment of the present invention. The method is applied in a notebook computer (as shown in FIG. 5) for receiving an email. Step S91, the notebook computer is determined whether it is in operating state. Step S92, if the notebook computer is in operating state, the first power is switched to the power supply circuit of the main circuit architecture, a power supplied by the first power is supplied to the wireless communication apparatus for downloading an electronic email, a downloaded electronic mail is stored in the hard drive. Step S93, a capacity provided by the second power is determined whether the capacity is lower than a predetermined capacity. Step S94, if the capacity provided by the second power is lower than a predetermined capacity and the first power is a socket power, the second power is charged by the first power. Step S98, if the notebook computer is in power-off state, the first power is switched to the power supply circuit of the sub-circuit architecture. Step S95, a capacity provided by the second power is determined whether the capacity is higher than a predetermined capacity. Step S96, if the capacity provided by the second power is higher than a predetermined capacity, a power supplied by the second power is supplied to the wireless communication apparatus for downloading an electronic mail, a downloaded electronic mail is then stored in the second storage unit. Step S97, if the capacity provided by the second power is lower than a predetermined capacity, a power supplied by the first power is supplied to the wireless communication apparatus for downloading an electronic mail, a downloaded electronic mail is then stored in the second storage unit or the hard drive.

Therefore, the user may perform a wireless transmission for the remote server through the communication unit while in operating state or power-off state. Use convenience in the computer apparatus is improved substantially. Electronic apparatus uses a sub-circuit architecture with low power consumption and low heat release for implementing data transmission. Transmitted data is then stored in a storage media. Use time of a battery is extended and working life of the battery is also increased without disconnecting data transmission.

Although the features and advantages of the embodiments according to the preferred invention are disclosed, it is not limited to the embodiments described above, but encompasses any and all modifications and changes within the spirit and scope of the following claims.

What is claimed is:

1. A computer apparatus, comprising:
a first circuit architecture including a microprocessor and providing a main function of said computer apparatus;
a first power supplier for supplying a first power to said first circuit architecture;
a second circuit architecture including a controller, a first storage unit and a communication unit, said controller defining a microcontroller chip, said communication unit defining a wireless communication apparatus having a second storage unit, said first storage unit defining a hard drive for storing data said second circuit architecture being a portion of said first circuit architecture, and said controller, said first storage unit and said communication unit being shared by said first circuit architecture and said second circuit architecture;
a liquid crystal module for displaying a message about downloading status when the computer apparatus is in power-off state; and
a power controller defining an electronic switch and electrically connecting said first power supplier so as to instantly switch said first power between said first circuit architecture and said second circuit architecture;
wherein, when said computer apparatus is in power-off state, said power is instantly toggled by said power controller from said first circuit architecture to said second circuit architecture for providing said first power to said communication unit uninterruptedly to facilitate continuous wireless communication, and downloaded or uploaded data is selected by said microcontroller chip to store on said hard drive or said second storage unit,
when said computer apparatus is in operating state, said microcontroller chip controls said wireless communication apparatus based on demands and decreases loading of the microprocessor.

2. The computer apparatus of claim 1, wherein said communication unit further includes a second power supplier and a second storage unit.

3. The computer apparatus of claim 2, wherein said communication unit is electrically connected to said computer apparatus through an external manner.

4. The computer apparatus of claim 2, wherein when said computer apparatus is in power-off state, if a capacity provided by said second power supplier is higher than a predetermined capacity, said second power supplier supplies a second power to said communication unit for performing said wireless transmission; if a capacity provided by said second power supplier is lower than a predetermined capacity, said first power supplier supplies said first power to said communication unit for performing said wireless transmission.

5. The computer apparatus of claim 4, wherein said wireless transmission includes downloading data or uploading data.

6. The computer apparatus of claim 5, wherein said data is stored in said second storage unit.

7. The computer apparatus of claim 2, wherein when said computer apparatus is in operating state, if a capacity provided by said second power supplier is lower than said predetermined capacity and said first power supplier is a socket power, said second power supplier is charged by said first power supplier.

8. A wireless network transmission system, comprising:
a remote server; and
a computer apparatus including:
a first circuit architecture including a microprocessor and providing a main function of said computer apparatus;
a first power supplier supplying a first power to said first circuit architecture;
a power controller defining an electronic switch and electrically connecting said first power supplier so as to instantly switch said first power between said first circuit architecture and a second circuit architecture;
a liquid crystal module for displaying a message about downloading status when the computer apparatus is in power-off state, and
said second circuit architecture including a controller, a first storage unit and a communication unit, said controller defining a microcontroller chip, said communication unit defining a wireless communication apparatus having a second storage unit, said first storage unit defining a hard drive for storing data,
said first circuit architecture being directly coupled to said second circuit architecture, and said second circuit architecture being a portion of said first circuit architecture, and said controller, said first storage unit and said communication unit being shared by said first circuit architecture and said second circuit architecture;
wherein said power controller controls said power supplier to instantly maintain uninterrupted power to said communication unit when said computer apparatus is switching between operating state and power-off state, said communication unit and said remote server are used to perform a continuous wireless transmission of data downloaded or uploaded by said controller to store the data on said first storage unit or said second storage unit in both operating state and power-off state, and when said computer apparatus is in operating state, said microcontroller chip controls said wireless communication apparatus based on demands and decreases loading of the microprocessor.

9. The wireless network transmission system of claim 8, wherein said communication unit further includes a second power supplier and a second storage unit.

10. The wireless network transmission system of claim 9, wherein said communication unit is electrically connected to said computer apparatus through an external manner.

11. The wireless network transmission system of claim 9, wherein, when said computer apparatus is in power-off state, if capacity provided by said second power supplier is higher than a predetermined capacity, said second power supplier supplies a second power to said communication unit and said remote server for performing said wireless transmission; if a capacity provided by second power supplier is lower than said predetermined capacity, said first power supplier supplies the first power to said communication unit and said remote server for performing said wireless transmission.

12. The wireless network transmission system of claim 9, wherein when said computer apparatus is in operating state and said first power supplier is a socket power, if a capacity provided by second power supplier is lower than said predetermined capacity, said second power supplier is charged by said first power supplier.

13. The wireless network transmission system of claim 9, wherein said wireless transmission includes downloading data, said data is stored in said second storage unit.

14. A method for wireless network transmission for use in a computer apparatus and a remote server to perform a wireless transmission, said computer apparatus comprising a first power supplier, a first circuit architecture including a microprocessor and providing a main function of said computer apparatus, a second circuit architecture and a power controller, wherein said first power supplier provides a first power to the first circuit architecture, said second circuit architecture includes a controller, a first storage unit and a communication unit, said second circuit architecture is a portion of said first circuit architecture, and said controller, said first storage unit and said communication unit are shared by said first circuit architecture and said second circuit architecture said method comprises:
- determining whether said computer apparatus is in operating state or power-off state so as to instantly toggle said first power between said first and second circuit architecture, providing uninterrupted said first power to said communication unit for facilitating continuous wireless communication to said remote server;
- using said power controller to supply said first power to said first circuit architecture so as to provide said wireless transmission between said communication unit and said remote server if said computer apparatus is in operating state;
- displaying on a liquid crystal module a message about downloading status when the computer apparatus is in power-off state; and
- using said power controller to supply said first power to said second circuit architecture so as to provide said wireless transmission between said communication unit and said remote server if said computer apparatus is in power-off state;
- wherein when said computer apparatus is in operating state, said controller controls said communication unit based on demands and decreases loading of the microprocessor.

15. The method for wireless network transmission of claim 14, wherein further comprises providing a second power supplier and a second storage unit to be said communication unit.

16. The method for wireless network transmission of claim 15, wherein further comprises using an external manner for electrically connecting said computer apparatus and said communication unit.

17. The method for wireless transmission of claim 15, wherein further comprises when said computer apparatus is in power-off state, if a capacity provided by said second power supplier is higher than a predetermined capacity, said second power supplier supplies a second power so as to provide said wireless transmission between said communication unit and said remote server; if a capacity provided by said second power supplier is lower than said predetermined capacity, said first power supplier supplies said first power so as to provide said wireless transmission between said communication unit and said remote server.

18. The method for wireless transmission of claim 17, wherein further comprises downloading data through said wireless transmission.

19. The method for wireless transmission of claim 18, wherein further comprises storing said data in said second storage unit.

20. The method for wireless transmission of claim 15, wherein further comprises when said computer is in operating state and said first power supplier is a socket power, if a capacity provided by said second power supplier is lower than said predetermined capacity, said second power supplier is charged by said first power supplier.

* * * * *